United States Patent
Wiedemann

(10) Patent No.: US 7,176,446 B1
(45) Date of Patent: Feb. 13, 2007

(54) METHOD AND APPARATUS FOR DISTRIBUTING LIGHT ONTO ELECTRONIC IMAGE SENSORS

(75) Inventor: Rudolf A. Wiedemann, Fremont, CA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 10/281,388

(22) Filed: Oct. 24, 2002

(51) Int. Cl.
*G01J 3/50* (2006.01)

(52) U.S. Cl. ............... 250/226; 250/208.1; 348/272

(58) Field of Classification Search .............. 250/226, 250/208.1, 208.2, 216; 356/402; 348/259, 348/272, 273, 280, 281, 289–291, 336–339
See application file for complete search history.

(56) References Cited

U.S. PATENT DOCUMENTS

| | | | |
|---|---|---|---|
| 4,518,864 A | | 5/1985 | Inuiya |
| 4,630,105 A | | 12/1986 | Knop |
| 4,639,772 A | | 1/1987 | Sluyter et al. |
| 4,734,778 A | | 3/1988 | Kobayashi |
| 4,882,619 A | * | 11/1989 | Hasegawa et al. .......... 348/337 |
| 4,896,217 A | | 1/1990 | Miyazawa et al. |
| 5,060,001 A | | 10/1991 | Kaneda |
| 5,075,716 A | | 12/1991 | Jehan et al. |
| 5,298,428 A | | 3/1994 | O'Rourke et al. |
| 5,302,778 A | | 4/1994 | Maurinus |
| 5,340,978 A | * | 8/1994 | Rostoker et al. ......... 250/208.1 |
| 5,359,190 A | | 10/1994 | O'Regan et al. |
| 5,400,072 A | | 3/1995 | Izumi et al. |
| 5,408,285 A | | 4/1995 | Azegami et al. |
| 5,416,318 A | | 5/1995 | Hegyi |
| 5,461,425 A | | 10/1995 | Fowler et al. |
| 5,471,515 A | | 11/1995 | Fossum et al. |
| 5,497,269 A | * | 3/1996 | Gal ............................ 359/615 |
| 5,548,773 A | | 8/1996 | Kemeny et al. |
| 5,572,372 A | | 11/1996 | Sekine et al. |
| 5,600,486 A | * | 2/1997 | Gal et al. ................... 359/569 |
| 5,625,451 A | | 4/1997 | Schiff et al. |
| 5,665,959 A | | 9/1997 | Fossum et al. |
| 5,780,884 A | | 7/1998 | Kumagai et al. |
| 5,821,532 A | | 10/1998 | Beaman et al. |
| 5,841,125 A | | 11/1998 | Livingston et al. |
| 5,841,126 A | | 11/1998 | Fossum et al. |

(Continued)

FOREIGN PATENT DOCUMENTS

JP     04223453 A     8/1992

(Continued)

OTHER PUBLICATIONS

Noble, Peter J.W., "Self-Scanned Silicon Image Detector Arrays", *IEEE Transactions on Electron Devices*, vol. ED-15, No. 4, Apr. 1968, pp. 202-209.

(Continued)

*Primary Examiner*—Thanh X. Luu
(74) *Attorney, Agent, or Firm*—Lowrie, Lando & Anastasi, LLP

(57) ABSTRACT

An apparatus that directs light onto individual photodetectors in an electronic image sensor array is disclosed. In one embodiment, refractive elements are used to appropriately refract different colors of light onto matching photodetector elements for different colors. In this manner, the image sensing apparatus most efficiently directs the proper colors of light on to the proper photodetector elements.

26 Claims, 9 Drawing Sheets

U.S. PATENT DOCUMENTS

| | | | |
|---|---|---|---|
| 5,850,195 | A | 12/1998 | Berlien, Jr. et al. |
| 5,861,645 | A | 1/1999 | Kudo et al. |
| 5,869,857 | A | 2/1999 | Chen |
| 5,880,691 | A | 3/1999 | Fossum et al. |
| 5,883,830 | A | 3/1999 | Hirt et al. |
| 5,886,659 | A | 3/1999 | Pain et al. |
| 5,923,369 | A | 7/1999 | Merrill et al. |
| 5,949,483 | A | 9/1999 | Fossum et al. |
| 5,965,871 | A | 10/1999 | Zhou et al. |
| 5,969,758 | A | 10/1999 | Sauer et al. |
| 5,981,932 | A | 11/1999 | Guerrieri et al. |
| 5,990,506 | A | 11/1999 | Fossum et al. |
| 5,995,163 | A | 11/1999 | Fossum et al. |
| 6,066,822 | A | 5/2000 | Nemoto et al. |
| 6,091,502 | A | 7/2000 | Weigl et al. |
| 6,122,009 | A | 9/2000 | Ueda |
| 6,122,084 | A | 9/2000 | Britz et al. |
| 6,130,423 | A | 10/2000 | Brehmer et al. |
| 6,137,535 | A * | 10/2000 | Meyers ........................ 348/340 |
| 6,290,382 | B1 | 9/2001 | Bourn et al. |
| 6,324,606 | B1 | 11/2001 | Lenehan et al. |
| 6,326,142 | B1 | 12/2001 | Royer |
| 6,335,759 | B1 | 1/2002 | Harada |
| 6,529,689 | B1 | 3/2003 | Oshima |
| 6,597,399 | B2 | 7/2003 | Horii |
| 6,618,083 | B1 | 9/2003 | Chen et al. |
| 6,625,558 | B1 | 9/2003 | Van Ausdall et al. |
| 2002/0011554 | A1 | 1/2002 | Brehmer et al. |
| 2002/0044215 | A1 | 4/2002 | Takagi et al. |
| 2002/0101528 | A1 | 8/2002 | Lee et al. |
| 2003/0112351 | A1 | 6/2003 | Clark |
| 2003/0137595 | A1 | 7/2003 | Takachi |

FOREIGN PATENT DOCUMENTS

| | | | |
|---|---|---|---|
| JP | 10-174114 | * | 6/1998 |
| JP | 10246848 A | | 9/1998 |

OTHER PUBLICATIONS

Chamberlain, Savvas G., Photosensitivity and Scanning of Silicon Image Detector Arrays:, *IEEE Journal of Solid-State Circuits*, vol. SC-4, No.6, Dec. 1969, pp. 333-342.

Aoki, Masakazu et al., "Session II: Advances in CCD and Imaging", *1980 IEEE International Solid-State Circuits Conference*, Feb. 13, 1980, pp. 26-27.

Ohba, Shinya et al., "MOS Area Sensor: Part II—Low-Noise MOS Area Sensor with Antiblooming Photodiodes", *IEEE Transactions on Electron Devices*, vol. ED-27, No. 8, Aug. 1980, pp. 1682-1687.

Ohba, Shinya et al., "Vertical Smear Noise Model for an MOS-Type Color Imager", *IEEE Transactions on Electron Devices*, vol. ED-32, No. 8, Aug. 1985, pp. 1407-1410.

Renshaw, D. et al., "ASIC Vision", *IEEE 1990 Custom Integrated Circuits Conference*, May 1990, pp. 7.3.1-7.3.4.

Renshaw, D. et al., "ASIC Image Sensors", *IEEE 1990*, Department of Electrical Engineering, University of Edinburgh, Aug. 1990, pp. 3038-3041.

Tanner, John E., "A High-Speed Video Camera and Recorder", *SPIE Ultrahigh Speed and High Speed Photography, Photonics and Videography '89*, vol. 1155, 1989, pp. 94-103.

Denyer, P.B. et al., "CMOS Image Sensors of Multimedia Applications", *IEEE 1993 Custom Integrated Circuits Conference*, Mar. 1993, pp. 11.5.1-11.5.4.

Yadid-Pecht, Orly et al., "A Random Access Photodiode Array for Intelligent Image Capture", *IEEE Transactions on Electron Devices*, vol. 38, No. 8, Aug. 1991, pp. 1772-1780.

Andoh, Fumihiko et al., "Session 13: Image Sensors, Processors and Displays", *Digest of Technical Papers*, ISSCC 90, Feb. 16, 1990, pp. 212-213.

Schaufelbuhl et al., "Uncooled Low-cost Thermal Imager Based on Micromachined CMOS Integrated Sensor Array," Dec. 2001; *Journal of Microelectromechanical Systems*, vol. 10, No. 4, pp. 503.510.

Sengupta et al., "Packaging Requirements and Solutions for CMOS Imaging Sensors," 1998, International Electronics Manufacturing Technology Symposium, pp. 194-198.

Karasawa et al., "Flip Chip Interconnection Method Applied to Small Camera Module," 2001, Electronic Components and Technology Conference.

* cited by examiner

Figure 1A

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

150 → (top-left 2×2 block)

| B | G | R | B | G | R | B | G |
|---|---|---|---|---|---|---|---|
| R | G | B | R | G | B | R | G |
| B | G | R | B | G | R | B | G |
| R | G | B | R | G | B | R | G |
| B | G | R | B | G | R | B | G |
| R | G | B | R | G | B | R | G |
| B | G | R | B | G | R | B | G |
| R | G | B | R | G | B | R | G |

Figure 2

Figure 6
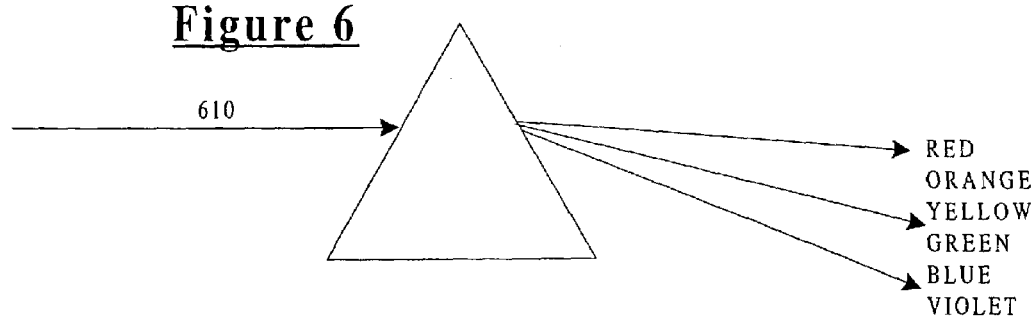
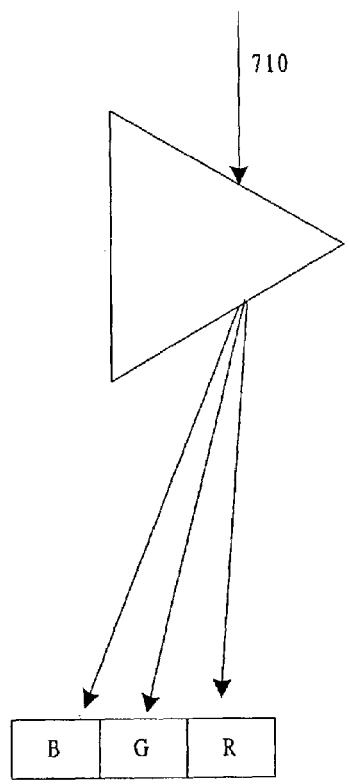
Figure 7

METHOD AND APPARATUS FOR DISTRIBUTING LIGHT ONTO ELECTRONIC IMAGE SENSORS

The present invention relates to the field of electronic image sensors. In particular the present invention discloses a method and apparatus for diffusing light such on an electronic image sensor.

BACKGROUND OF THE INVENTION

Electronic image sensors are created by assembling a matrix of individual photodetectors that sense different colors of light such that the different colors can be assembled into color pixels. Specifically an image sensor array is created with individual photdetectors elements that sense red, green, and blue light. The light sensed by nearby red, green, and blue color photodetector elements is combined together to create a single picture element (pixel). Since pixels are created by combining light from adjacent photodetectors elements, it would be desirable to ensure that the light striking adjacent photodetectors elements is very similar.

SUMMARY OF THE INVENTION

The present invention discloses methods and apparatus for property directly light onto individual photodetectors in an electronic image sensor array. In one embodiment, a low angle diffuser material is used to spread the same light onto adjacent photodetector elements. In a second embodiment, refractive elements are used to appropriate refract different colors of light onto matching colored photodetector elements In this manner, the image sensing apparatus most efficiently directs the proper colors of light onto the proper photodetector elements.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIG. 1A illustrates a Bayer pattern of individual photodetector elements.

FIG. 1B illustrates how white light values are derived from four adjacent color pixels.

FIG. 2 illustrates a "green stripe" pattern of individual photodetector elements.

FIG. 6 illustrates a prism refracting light into a spectrum.

FIG. 7 illustrates a prism refracting different colors of light onto different colored photodetector elements.

DETAILED DESCRIPTION OF THE PREFERRED EMBODIMENT

Figure 3:
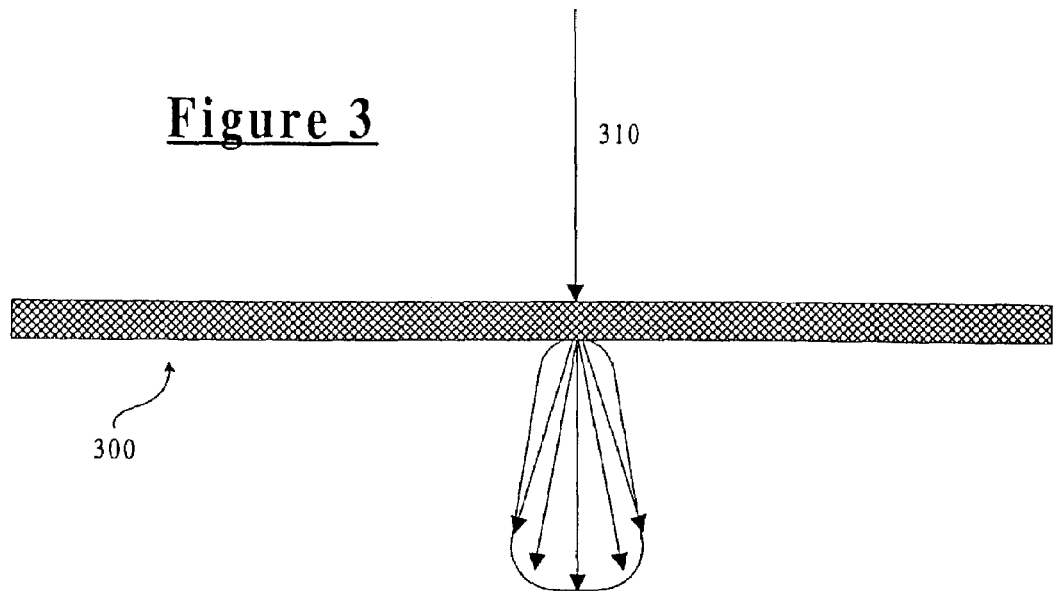
FIG. 3 illustrates the light diffusing property of a low angle diffuser.

A method and apparatus for distributing light on an electronic image sensor is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to CMOS and CCD image sensors. However, the same techniques can easily be applied to other types of electronic image sensors.

Color Image Sensors

Color sensing electronic image sensors are created by assembling a matrix of individual photodetectors that sense different colors of light such that the different colors can be assembled into color pixels. For example, FIG. 1A illustrates the classic "Bayer pattern" image sensor array wherein individual photodetectors sense red (R), green(G), and blue (B) light. The different color photodetectors are created by placing an appropriate red (R), green (G), and blue (B) filters in front of light intensity photodetectors. In this manner, each photodetector only captures red (R), green (G), and blue (B) light as determined by its respective filter. The Bayer pattern is used in both CCD and CMOS image sensors.

The light detected form the individual red (R), green (G), and blue (B) photodetectors is combined to generate the color of a single white pixel. Referring to FIG. 1B, an adjacent set of red (R), green (G), green (G), and blue (B) are combined to form a single white pixel 150. Thus, a Bayer pattern electronic image sensor is similar to a color television that generates a pixel of arbitrary color by combining various levels of red, green, and blue light by exciting red, green, and blue phosphors with an electron gun.

As illustrated in FIGS. 1A and 1B, the various different colored photodetectors that comprise a single colored pixel are not located in the exact same physical space. Instead, the various different colored photodetectors that comprise a single colored pixel are very close to each other. In most situations; the colors of adjacent light rays 110 and 120 are the same or very similar such that by combining the light from adjacent photodetectors generates a representative color for the local region. However, in some circumstances, different colored light rays will strike different colored photodetectors that are used to create a single pixel. For example, light rays 110 and 120 may consist of different colors of light. In such circumstances, the composite pixel signals generated from the adjacent photodetectors that receive different colored light will not accurately reflect the received light. Such occurrences will create colored fringes in the resultant image.

Other color sensor patterns exhibit the same problems. FIG. 2 illustrates a "green stripe" pattern of different colored photodetectors. The green stripe pattern uses a stripe of green photodetectors to collect green light. However, the green stripe may cause color fringes for images that have vertical color bands.

To prevent such color fringes from appearing in images captured using electronic image sensors, the present invention introduces methods of spreading the incoming light such that adjacent incoming light rays are spread onto adjacent photodetectors. In this manner, adjacent photodetectors will detect very similar incoming light such that a composite pixel generated by adjacent photodetectors will more accurately reflect the incoming light.

An Electronic Image Sensor with a Low Angle Diffuser

A first method of spreading the incoming light is to use a low angle diffuser material. Specifically, a low angle diffuser material is used to scatter incoming light before the light reaches an electronic image detector.

Low Angle Diffuser Material

FIG. 3 illustrates the properties of a low angle diffuser material 300. Referring to FIG. 3, when an incident light ray 310 strikes a sheet of low angle diffuser material 300, the low angle diffuser material 300 slightly scatters the light as the light passes through. The resultant output on the other side of the low angle diffuser material 300 is a large portion of the incident light passing through with little change. However, some of the incident light energy is scattered at at various low angles from the incident angle. When an observer is very close to the low angle diffuser material 300, the light scattering is not very noticeable. However, as an observer backs away from the low angle diffuser material 300 the light scattering blurs the original incident light pattern such that only a blurry representation of the original incident light pattern remains.

Low Angle diffuser Material with an Electronic Image Sensor

Figure 4:
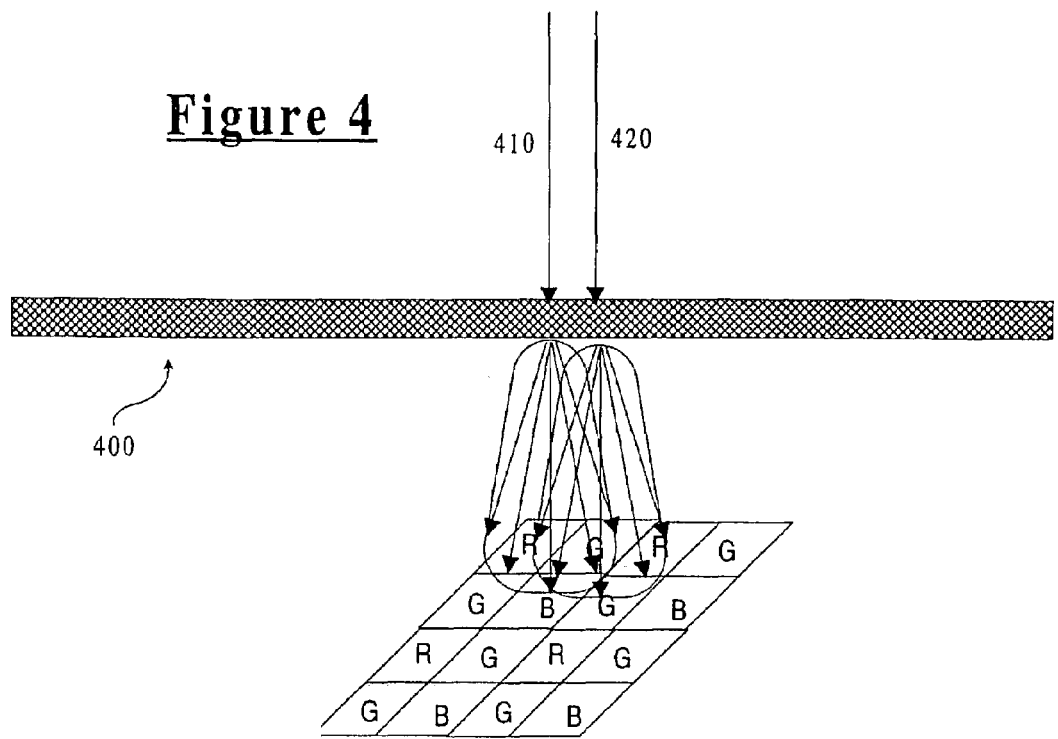
FIG. 4 illustrates how a low angle diffuser can be used to spread light onto four adjacent colored photodetector elements that form a single white pixel/

FIG. 4 illustrates how a low angle diffuser material 400 may be used to benefit an electronic image detector. In FIG. 4, a sheet of low angle diffuser material 400 has been placed in front of a Bayer pattern pixel arrangement that consists of red (R), green (G), green (G), and blue (B) photodetectors. As a first incoming light ray 410 strikes the low angle diffuser material 400, the low angle diffuser material 400 scatters the light ray 410 such that the scattered light falls on all of the photodetectors that comprise a single white pixel. Similarly, as a second incoming light ray 420 which is at a lateral distance of one pixel from light ray 410 strikes the low angle diffuser material 400, the low angle diffuser material 400 scatters the light ray 420 such that the light ray's scattered light also falls on all of the photodetectors of the white pixel shifted horizontally or vertically one pixel width.

As can be seen from FIG. 4, the low angle diffuser material 400 scatters the light from adjacent light rays onto all the photodetectors in a pixel such that the photodetector in a pixel receive an "average" of the light striking the pixel's area. In this manner, color fringing caused by sharp color changes is eliminated. Although FIG. 4 only illustrates an example using a Bayer pattern image sensor array, a green stripe pattern image sensor array would benefit from the low angle diffuser material 400 in the same manner.

Low Angle Diffuser Material over Electronic Image Sensor Array Implementation

Figure 5:
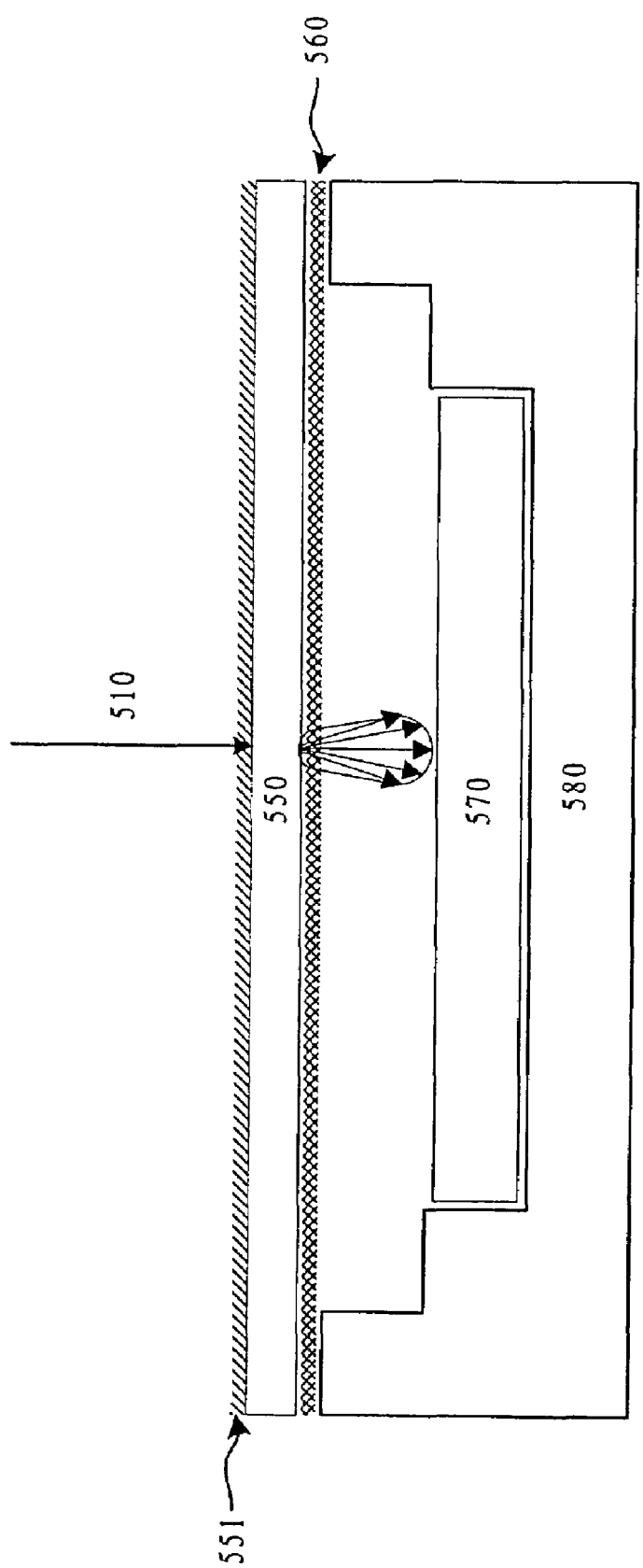
FIG. 5 illustrates one embodiment of an electronic image sensor array incorporating a sheet of light diffusing material.

FIG. 5 illustrates one embodiment of an electronic image sensor device 500 that uses a low angle diffuser material sheet 560. Referring to FIG. 5, an electronic image sensor die 570 has been placed within a package 580. The electronic image sensor die may be a Charge coupled Device (CCD) type sensor, a Complementary metal Oxide Semiconductor (CMOS), or any other type of electronic image sensor. To protect the electronic image sensor die 570, a piece of transparent material 550 has been placed in front of the electronic image sensor die 570. The transparent material 550 may be coated with an infrared absorbing material 551 to prevent infrared light from damaging the electronic image sensor die 570.

To diffuse the incoming light (such as light ray S10) a sheet of light diffusing material 560 has been attached to the transparent material 550. In one embodiment, the sheet of light diffusing material 560 may be a sheet of Light Shaping Diffuser (LSD) material from Physical Optics Corporation of Torrance, Calif.

An Electronic Image Sensor with Refractive Light Spreading

Different colors of light are refracted by different amounts. Referring to FIG. 6, a simple prism is illustrated wherein incoming white light 610 is divided into various different colors by refracting each light color frequency by a different amount. As illustrated in FIG. 6, the refracted light forms a spectrum rainbow.

Refractive Light Spreading

One embodiment of the present invention takes advantage of this effect by using refraction to guide the proper frequencies of light onto matching photodetectors elements. Specifically, FIG. 7 illustrates how a ray of white light 710 can be refracted such that the red, green, and blue light is refracted onto red (R), Green (G), and Blue (B) electronic photodetectors elements, respectively. Although only a simple prism embodiment has been illustrated, many other types of refractive lenses can be used to direct light onto an image sensor array in a desired manner.

Figures 8, 9:
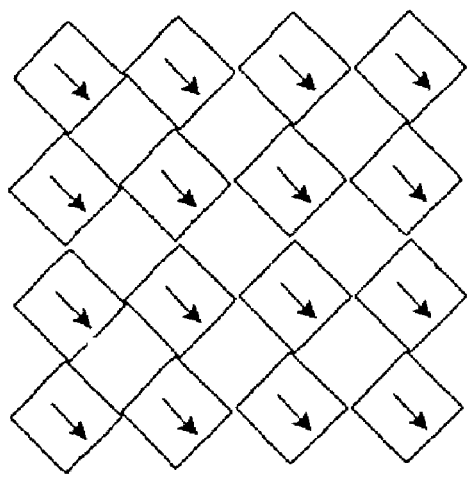
FIG. 9 illustrates the first refracting pattern of FIG. 7 over a Bayer pattern electronic image sensor array.

FIG. 8 illustrates a first embodiment of a refractive pattern that can be used to refract light onto a set of four colored photodetectors elements that comprise a single pixel. As illustrated in FIG. 8, the individual refracting elements refract light in the direction of the arrow. FIG. 9 illustrates the refractive sheet of FIG. 8 overlaid on top of a Bayer pattern image sensor array. As illustrated in FIG. 9, the incoming light is refracted such that the red light falls on red photodetectors elements, the green light falls on green photodetectors elements, and the blue light falls on blue photodetectors elements.

Figure 10A:
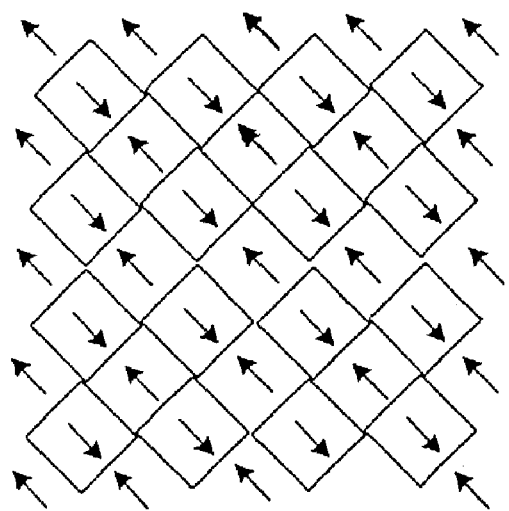
FIG. 10A illustrates a second more efficient refracting pattern.
Figure 10B:
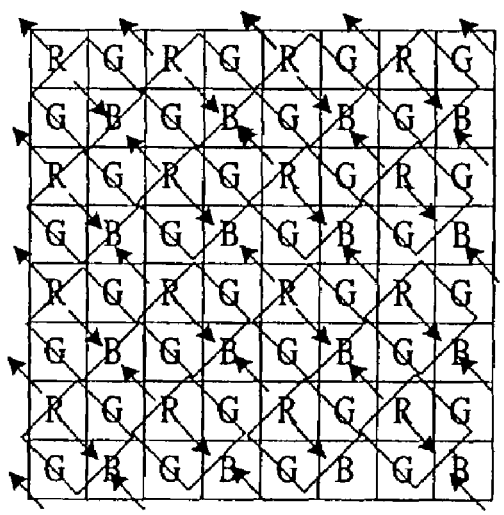
FIG. 10B illustrates the second refracting pattern of FIG. 10A over a Bayer pattern electronic image sensor array.

FIG. 10A illustrates a second embodiment of a refractive pattern that can be used to refract light onto a colored image sensor array. As illustrated in the embodiment of FIG. 10A, the spaces between the refractive elements in FIG. 8 have been fitted with refractive elements that refract light in the opposite direction. When the refractive element pattern of FIG. 10A is placed onto a Bayer pattern image sensor array as illustrated in FIG. 10B, all of the incoming light is properly refracted onto photodetectors elements.

Figure 11A:
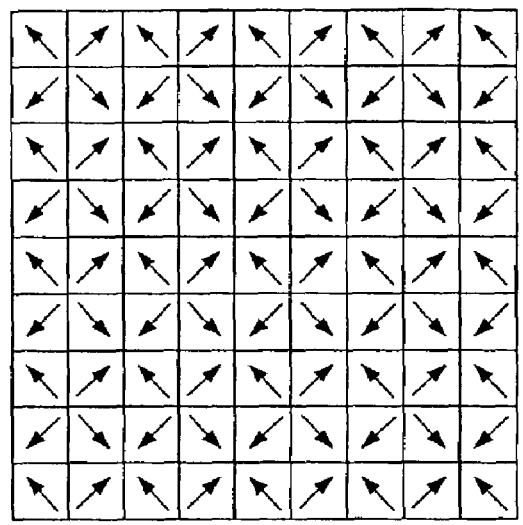
FIG. 11A illustrates a third refracting pattern embodiment that may be used.
Figure 11B:
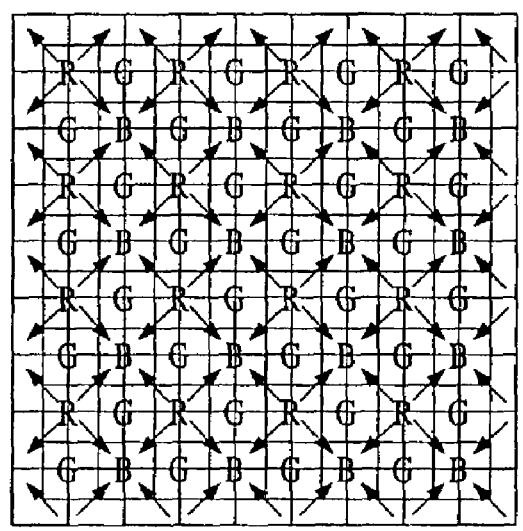
FIG. 11B illustrates the third refracting pattern of FIG. 11a over a Bayer pattern electronic image sensor array.

FIG. 112A illustrates a third embodiment of a refractive pattern that can be used to refract light onto a colored image sensor array. FIG. 11A illustrates an embodiment of an array of square prism with the refraction directed along the diagonal direction of each prism. FIG. 11B illustrates the refractive element pattern of FIG. 11A is placed onto a Bayer pattern image sensor array. As illustrated FIG. 11B, the refractive pattern bends the incoming light from various directions towards the blue photodetectors elements.

The refractive light guiding system is very efficient since all of the light rays from the desired frequencies are directed to strike the proper colored photodetectors elements. Thus, the refractive light guiding system will be more efficient than the diffuser system since the light from the proper frequencies is directed onto matching photodetectors elements. It should be noted that FIGS. 8, 10A and 11A only illustrate three different possible refractive element patterns. Many other refractive element patterns exist. Furthermore, many different refractive lens designs can be used to refract light in different patterns.

Refractive Light Spreading Onto an Electronic Image Sensor

Figure 12:
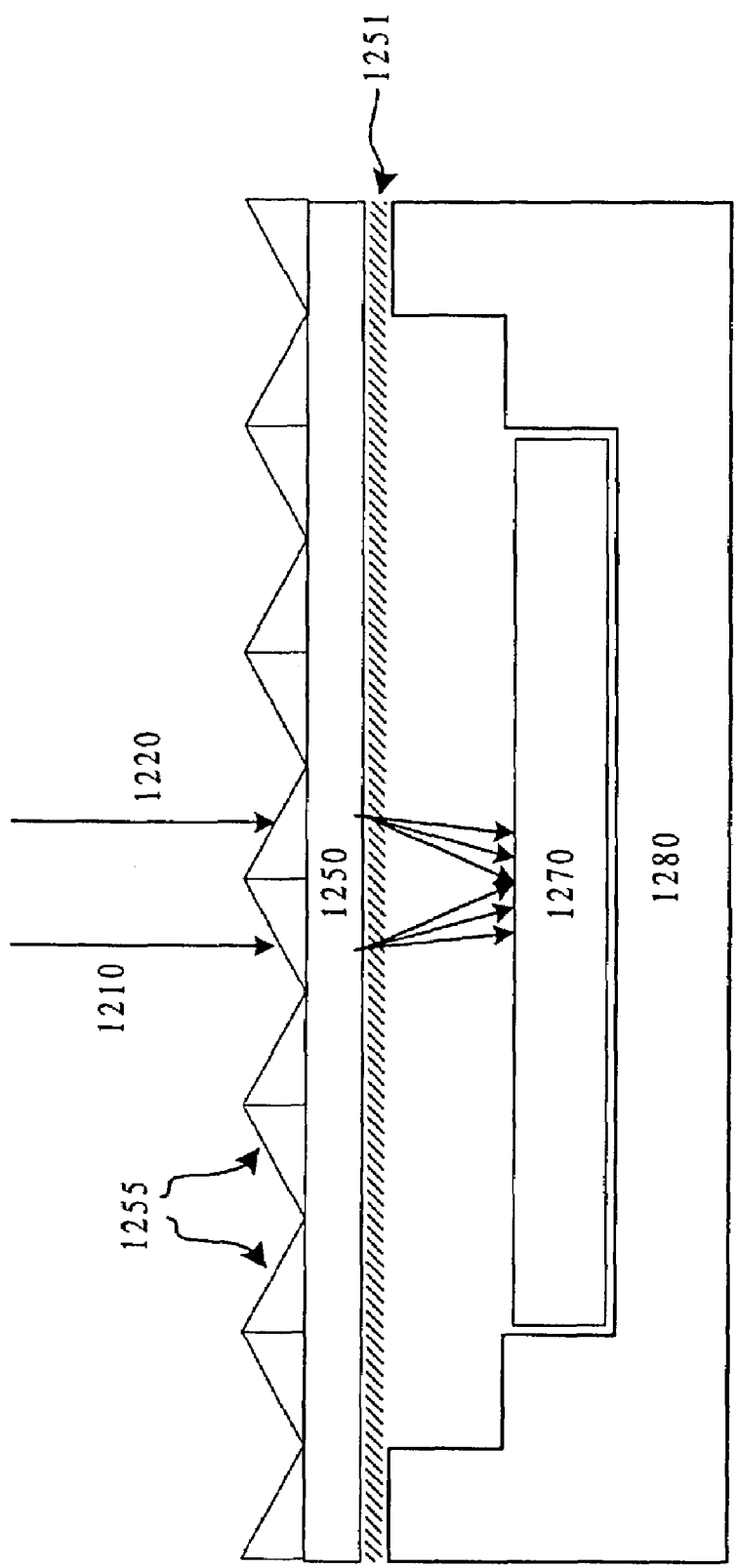
FIG. 12 illustrates one embodiment of a set of refractive elements refracting light onto an electronic image sensor array.

FIG. 12 illustrates an implementation of the second embodiment of a refractive pattern as disclosed in FIGS. 10A and 10B. Referring to FIG. 12, an electronic image sensor die 1270 has been placed within a package 1280. The electronic image sensor die may be a Charge Coupled Device (CCD) type sensor, a Complementary Metal Oxide Semiconductor (CMOS), or any other type of electronic image sensor. A piece of transparent material 1250 protects the electronic image sensor die 1270 from damage. The transparent material 1250 may be coated with an infrared absorbing material 1251 to prevent infrared light from damaging the electronic image sensor die 1270.

To refract the incoming light (such as light rays 1210 and 1220) a set of refractive elements 1255 have been formed on the transparent material 1250. In one embodiment, the refractive elements 1255 may be formed using the monolithic lenslet module technology of Adaptive Optics Associates, Inc. of Cambridge, Mass.

As illustrated in FIG. 12, incoming light rays 1210 and 1220 are refracted by the refractive elements 1255 such that the different colored light strikes different areas of the image sensor die 1270. By properly aligning the refractive elements 1255 with the image sensor die 1270, the refractive elements 1255 will refract red light onto red image sensors, green light onto green image sensors, and blue light onto blue image sensors.

The foregoing has described a method and apparatus for distributing light on an electronic image sensor. It is contemplated that changes and modifications may be made by one of ordinary skill in the art, to the materials and arrangements of elements of the present invention without departing from the scope of the invention.

I claim:

1. A method of constructing an electronic image sensor device, said method comprising:

forming an electronic image sensor array sensitive to at least three distinct wavelengths, comprising a plurality of individual image sensors, each made sensitive to substantially only one of the three distinct wavelengths, the plurality of individual image sensors arranged in a plurality of parallel lines defining an imaging plane; and mounting a pattern of refractive elements in front of said electronic image sensor array, the pattern of refractive elements configured such that light of each one of the three distinct wavelengths is refracted in a direction oblique in the imaging plane relative to the parallel lines and is concentrated onto the individual image sensors sensitive to the one of the three distinct wavelengths;

wherein said act of mounting the pattern of refractive elements in front of said electronic image sensor array further comprises configuring the pattern of refractive elements to refract light at a first wavelength in a first direction oblique in the imaging plane relative to the parallel lines and to refract light at a second wavelength in a second direction oblique in the imaging plane relative to the parallel lines onto the individual image sensors sensitive to the second wavelength; and wherein said act of refracting light in the first direction and in the second direction comprises refracting the light in the first direction substantially 180 degrees from said second direction.

2. The method as claimed in claim 1 wherein said act of mounting the pattern of refractive elements in front of said electronic image sensor array further comprises configuring the pattern of refractive elements to refract light in a third direction and a fourth direction oblique in the imaging plane relative to the parallel lines.

3. The method as claimed in claim 2 wherein said first, second, third and fourth directions are substantially 90 degrees apart.

4. A method of constructing an electronic image sensor device, said method comprising:

forming an electronic image sensor array sensitive to at least three distinct wavelengths, comprising a plurality of individual image sensors, each made sensitive to substantially only one of the three distinct wavelengths, the plurality of individual image sensors arranged in a plurality of parallel lines defining an imaging plane; and mounting a pattern of refractive elements in front of said electronic image sensor array, the pattern of refractive elements configured such that light of each one of the three distinct wavelengths is refracted in a direction oblique in the imaging plane relative to the parallel lines and is concentrated onto the individual image sensors sensitive to the one of the three distinct wavelengths;

wherein the plurality of individual image sensors is arranged in a Bayer pattern.

5. An electronic image sensor apparatus, said apparatus comprising:

an electronic image sensor array sensitive to at least three distinct wavelengths, comprising a plurality of individual image sensors, each made sensitive to substantially only one of the three distinct wavelengths, the plurality of individual image sensors arranged in a plurality of parallel lines defining an imaging plane; and a pattern of refractive elements mounted in front of said electronic image sensor array the pattern of refractive elements configured such that light of each one of the three distinct wavelengths is refracted in a direction oblique in the imaging plane relative to the parallel lines and is concentrated onto the individual image sensors sensitive to the one of the three distinct wavelengths;

wherein said pattern of refractive elements in front of said electronic image sensor array is further configured to refract light at different ones of the three distinct wavelengths in different directions oblique in the image plane relative to the parallel lines; and wherein said first direction is substantially 180 degrees from said second direction.

6. The electronic image sensor apparatus as claimed in claim 5 wherein said first pattern of refractive elements in front of said electronic image sensor array is further configured to refract light in a third direction and a fourth diagonal direction oblique in the image plane relative to the parallel lines.

7. The electronic image sensor apparatus as claimed in claim 6, wherein said first, second, third and fourth directions are substantially 90 degrees apart.

8. An electronic image sensor apparatus, said apparatus comprising:
an electronic image sensor array sensitive to at least three distinct wavelengths, comprising a plurality of individual image sensors, each made sensitive to substantially only one of the three distinct wavelengths, the plurality of individual image sensors arranged in a plurality of parallel lines defining an imaging plane; and
a pattern of refractive elements mounted in front of said electronic image sensor array the pattern of refractive elements configured such that light of each one of the three distinct wavelengths is refracted in a direction oblique in the imaging plane relative to the parallel lines and is concentrated onto the individual image sensors sensitive to the one of the three distinct wavelengths;
wherein the plurality of electronic image sensors is arranged in a Bayer pattern.

9. An image sensor apparatus comprising:
an array of image sensor elements arranged in a plurality of parallel lines forming a Bayer pattern of image sensor elements including at least three image sensor elements, each sensitive and corresponding to one of three different wavelengths, the array defining an imaging plane; and
a refractive element mounted in front of the array of image sensor elements, the refractive element configured to refract an image-forming beam such that light of each one of the three different wavelengths is refracted in a direction in the imaging plane that is oblique relative to the parallel lines of the Bayer pattern and is concentrated onto the image sensor elements sensitive to each one of the three different wavelengths.

10. The image sensor apparatus as claimed in claim 9, further comprising:
a protective cover transparent to the image forming beam for the array of image sensors; and
wherein the refractive element is formed on the protective cover.

11. The image sensor apparatus as claimed in claim 10, wherein the protective cover further comprises an infrared blocking coating.

12. The image sensor apparatus as claimed in claim 9, wherein the array of image sensor elements comprises a charged coupled device (CCD).

13. The image sensor apparatus as claimed in claim 9, wherein the array of image sensor elements comprises a CMOS image sensor array.

14. The image sensor apparatus as claimed in claim 9, wherein the refractive element is further configured to refract light at different ones of the three different wavelengths in different directions oblique in the imaging plane relative to the parallel lines.

15. The image sensor apparatus as claimed in claim 14, wherein the different directions include two directions substantially 180 degrees apart.

16. The image sensor apparatus as claimed in claim 14, wherein the different directions include four directions.

17. The image sensor apparatus as claimed in claim 16, wherein said four directions are substantially 90 degrees apart.

18. A method of constructing an electronic image sensor device, said method comprising:
forming an electronic image sensor array comprising at least three individual image sensors, each sensitive to one of three different wavelengths and arranged in a Bayer pattern on an imaging plane; and
mounting a pattern of refractive elements in front of said electronic image sensor array of individual image sensors arranged in a Bayer pattern, the pattern of refractive elements configured such that each of the three different wavelengths of light is refracted in a diagonal direction in the imaging plane relative to the Bayer pattern array of individual image sensors in a pattern concentrating the each of the three different wavelengths of light on correspondingly sensitive ones of the at least three individual image sensors.

19. The method as claimed in claim 18 wherein the act of mounting a pattern of refractive elements in front of said electronic image sensor array comprises:
forming said pattern of refractive elements on a cover transparent at the three different wavelengths; and
mounting said cover in front of said electronic image sensor array.

20. The method as claimed in claim 19 wherein the act of mounting the cover further comprises providing an infrared blocking coating.

21. The method as claimed in claim 18 wherein the act of mounting said electronic image sensor array comprises providing a charge coupled device (CCD).

22. The method as claimed in claim 18 wherein the act of mounting said electronic image sensor array comprises providing a CMOS image sensor.

23. The method as claimed in claim 18 wherein said act of mounting the pattern of refractive elements in front of said electronic image sensor array further comprises configuring the pattern of refractive elements to refract light at two of the three different wavelengths in different directions in the imaging plane relative to the Bayer pattern array of individual image sensors, onto correspondingly sensitive individual image sensors.

24. The method as claimed in claim 23 wherein said act of refracting light in different directions comprises refracting the light in directions substantially 180 degrees apart.

25. The method as claimed in claim 23 wherein said act of mounting the pattern of refractive elements in front of said electronic image sensor array further comprises configuring the pattern of refractive elements to refract light in four different directions in the imaging plane.

26. The method as claimed in claim 25 wherein said four different directions are substantially 90 degrees apart.

* * * * *

UNITED STATES PATENT AND TRADEMARK OFFICE
CERTIFICATE OF CORRECTION

| | | |
|---|---|---|
| PATENT NO. | : 7,176,446 B1 | |
| APPLICATION NO. | : 10/281388 | |
| DATED | : February 13, 2007 | |
| INVENTOR(S) | : Rudolf A. Wiedemann | |

It is certified that error appears in the above-identified patent and that said Letters Patent is hereby corrected as shown below:

On Title page, a section should be added, entitled -- Related U.S. Application Data --, which should read -- Division of application no. 09/396,333, filed on Sept. 15, 1999, now abandoned --.
      In column 1, line 27, "property" should read -- properly --.
      In column 1, line 56, "pixel/" should read -- pixel. --.
      In column 1, between lines 61 and 62, an additional sentence should read -- FIG. 8 illustrates a first refracting pattern. --.
      In column 2, line 4, "11a" should read --11A --.
      In column 3, line 31, "at at" should read -- at --.
      In column 3, line 40, "diffuser" should read -- Diffuser --.
      In column 3, line 57, "vertically one" should read -- vertically by one --.
      In column 4, line 7, "coupled" should read -- Coupled --.
      In column 4, line 8, "metal" should read -- Metal --.
      In column 4, line 16, "S10" should read -- 510 --.
      In column 4, line 64, "FIG. 112A" should read -- FIG. 11A --.
      In column 5, line 3, "illustrated FIG. 11B" should read -- illustrated in FIG. 11B --.

Signed and Sealed this

Twenty-second Day of May, 2007

JON W. DUDAS
*Director of the United States Patent and Trademark Office*